United States Patent [19]
Shur

[11] 3,799,499
[45] Mar. 26, 1974

[54] FLUID FLOW ISOLATION/REGULATION VALVE

[75] Inventor: Ira Shur, Rockville, N.Y.

[73] Assignee: Flair Manufacturing Corp., Houppauge, L.I., N.Y.

[22] Filed: Aug. 31, 1972

[21] Appl. No.: 285,462

[52] U.S. Cl. ............................. 251/290, 251/309
[51] Int. Cl. ............................................. F16k 31/60
[58] Field of Search ........................... 251/160–166, 251/123, 124, 290, 304–309

[56] References Cited
UNITED STATES PATENTS

| | | | |
|---|---|---|---|
| 714,410 | 11/1902 | Stainton et al. | 251/305 |
| 2,574,080 | 11/1951 | Wilson | 251/165 |
| 3,108,778 | 10/1963 | Rader | 251/308 X |
| 3,467,356 | 9/1969 | Mueller | 251/309 X |
| 1,891,759 | 12/1932 | Flodin | 251/160 |

Primary Examiner—Henry T. Klinksiek

[57] ABSTRACT

An isolation/regulating valve including a valve body having a hollow interior and a frustoconical valve seat. A valve stem is rotatable in said valve body and includes a liquid flow control element rotatable in said valve seat. Said flow control element has opposed parallel flat surfaces which are trapezoidally shaped.

8 Claims, 6 Drawing Figures

PATENTED MAR 26 1974

FLUID FLOW ISOLATION/REGULATION VALVE

BACKGROUND OF THE INVENTION

1. Field of the Invention

Isolation/regulating valve

2. Description of the Prior Art

In many flow systems it is desirable to have an isolation/regulating valve for controlling the flow of liquid through a conduit that feeds a zone. As an example, it is desirable to be able to regulate or positively shut off the flow of hot water through the individual loops of a hydronic heating system.

In the past, gate valves and globe valves customarily have been used as isolation/regulating valves. A gate valve conventionally includes a valve stem having a wedge-shaped gate that can, by rotating a screw, be lowered into a seat to stop flow through a valve body or shifted partly or all the way into a recess so that there is partial or no blockage in the valve body. A globe valve conventionally includes a circular opening (seat) in a partition in a valve body. A valve stem has a circular disc that can, by rotating a screw, be locked into engagement with the opening to stop flow or shifted to varying degrees for selected degrees of resistance to flow.

In using these prior art isolation/regulating valves very frequently both the valve seat and flow control element were made of metal and, accordingly there was metal-to-metal contact when the valve was closed. This was undesirable for a number of reasons. First, by having metal-to-metal contact a substantial force was required to move the stem relative to the seat to open a closed valve. Nor was it a solution to have a gap of any significant size between the flow control element and the seat in closed position since this enabled liquid to leak past the flow control element, thus diminishing the effectiveness of the valve. A good seal between the flow control element and the seat obtained by having the flow control element fit in the seat so as to leave no gap therebetween was expensive in that low tolerances were required and binding often occurred.

An additional drawback with some of the prior art isolation/regulating valves was then when the flow control element was in the fully opened position said element caused a significant hydraulic pressure drop through the valve body. This, of course, was undesirable as it necessitated greater pumping pressures to obtain a given flow.

Another disadvantage of the prior art isolation/regulating valves was that the valve stem included a threaded spindle for which many turns were required to change flow conditions. This was undesirable since it increased the time needed to operate the valve.

A further drawback with some of the prior art isolation/regulating valves was that the grease or other lubricant sometimes applied to reduce friction might contaminate the liquid flowing through the valve and ultimately was washed away, restoring the problem the grease was supposed to alleviate.

SUMMARY OF THE INVENTION

Purposes of the Invention

It is an object of the present invention to provide an improved isolation/regulating valve not subject to the foregoing drawbacks.

Still another object of the present invention is to provide an improved isolation/regulating valve which does not create appreciable hydraulic pressure losses.

A further object of the present invention is to provide an improved isolation/regulating valve that includes means to minimize leakage past the flow control element when the same is in a fully closed position.

Another object of the present invention is to provide an improved isolation/regulating valve which eliminates metal-to-metal contact between the flow control element and the seat therefor.

Still another object of the present invention is to provide an improved isolation/regulating valve that is packless and is of compact size and without a long external stem so that it will not interfere with dampers in a baseboard installation.

Another object of the present invention is to provide an improved isolation/regulating valve wherein when the valve stem is in its fully opened position there is no significant blockage of flow.

A further object of the present invention is to provide an improved isolation/regulating valve the stem of which can be simply and easily positioned to accurately balance any loop of a heating system.

Still a further object of the present invention is to provide an improved isolation/regulating valve the stem of which can be securely locked in any desired position.

Yet another object of the present invention is to provide an improved isolation/regulating valve which does not require lubrication to facilitate easy movement of the valve stem relative to the valve body.

A further object of the present invention is to provide an improved isolation/regulating valve which is reliable in operation and economical to make.

Other objects of the invention in part will be obvious and in part will be pointed out hereinafter.

BRIEF DESCRIPTION OF THE INVENTION

According to the present invention, the foregoing and other objects were achieved by a valve body having an inlet section, a discharge section and a valve seat section intermediate said inlet and discharge sections. Formed at the upstream portion of said valve seat section is a trapezoidally-shaped passageway. Formed at the downstream portion of said valve seat section is a trapezoidally-shaped passageway. The trapezoidally-shaped passageways are identical in configuration and are in registry.

Located at the mid-portion of said valve seat section at the upper part thereof is an upper cylindrical opening. Extending downwardly from said upper cylindrical opening is a squat tapered circular shoulder. Located beneath said tapered circular shoulder is a frustoconical valve seat. The trapezoidal passageway at the upstream portion of said valve seat section extends to said frustoconical valve seat. In a similar fashion, the trapezoidal passageway at the downstream portion of said valve seat section extends from said frustoconical valve seat. A lower cylindrical opening extends downwardly from the lowermost portion of said valve seat. The upper cylindrical opening, the tapered circular shoulder, the frustoconical valve seat and the lower circular opening are coaxial.

A valve stem is provided which includes a cylindrical upper valve head. The valve head includes means for enabling said stem to be rotated. Depending downwardly from said valve head is an upper post and integral with the lowermost portion of said upper post is a partially tapered flange. An O-ring is captively held about said upper post between said valve head and said flange. Extending downwardly from said flange is a thin valve blade having first and second opposed parallel flat surfaces which are trapezoidally shaped and identical to one another. The valve blade at its lowermost portion is integral with a frustoconically shaped lower valve head. An O-ring plate is secured to the bottom of said lower valve head. A lower post depends from said O-ring plate and extends to a lower O-ring plate. Located about said lower post between said O-ring plates is an O-ring. The lower post has a male threaded section below the lower O-ring plate.

The upper valve head is received in the upper cylindrical opening with the tapered valve flange resting partly on the tapered circular shoulder beneath said cylindrical opening and partly on an upper portion of the frustoconical valve seat. The valve blade is rotatable on and in sliding contact with the frustoconical seat. The lower valve head partly contacts the frustoconical seat and extends into the lower cylindrical opening of the valve body. The threaded section projects beyond the valve body. A nut engages the threaded section of said lower post for selectively locking the valve stem in any desired position.

A thin coating of a low friction resilient synthetic plastic material covers at least those portions of the valve stem that are on the fructoconical valve seat so as to provide a good seal with the seat and minimize dynamic and static friction between the stem and seat.

The invention accordingly consists in the features of construction, combination of elements, and arrangement of parts which will be exemplified in the isolation/regulating valve hereinafter described and of which the scope of application will be indicated in the appended claims.

BRIEF DESCRIPTION OF THE DRAWINGS

In the drawings wherein like parts in the different figures are denoted by the same reference numerals.

DESCRIPTION OF THE PREFERRED EMBODIMENTS

Figure 1:
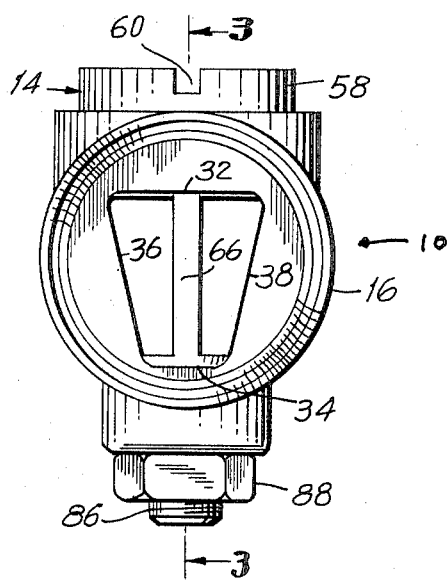
FIG. 1 is an end plan view of the isolation/regulating valve of the present invention when the valve blade is so positioned as to allow maximum flow through the valve body.
Figure 2:
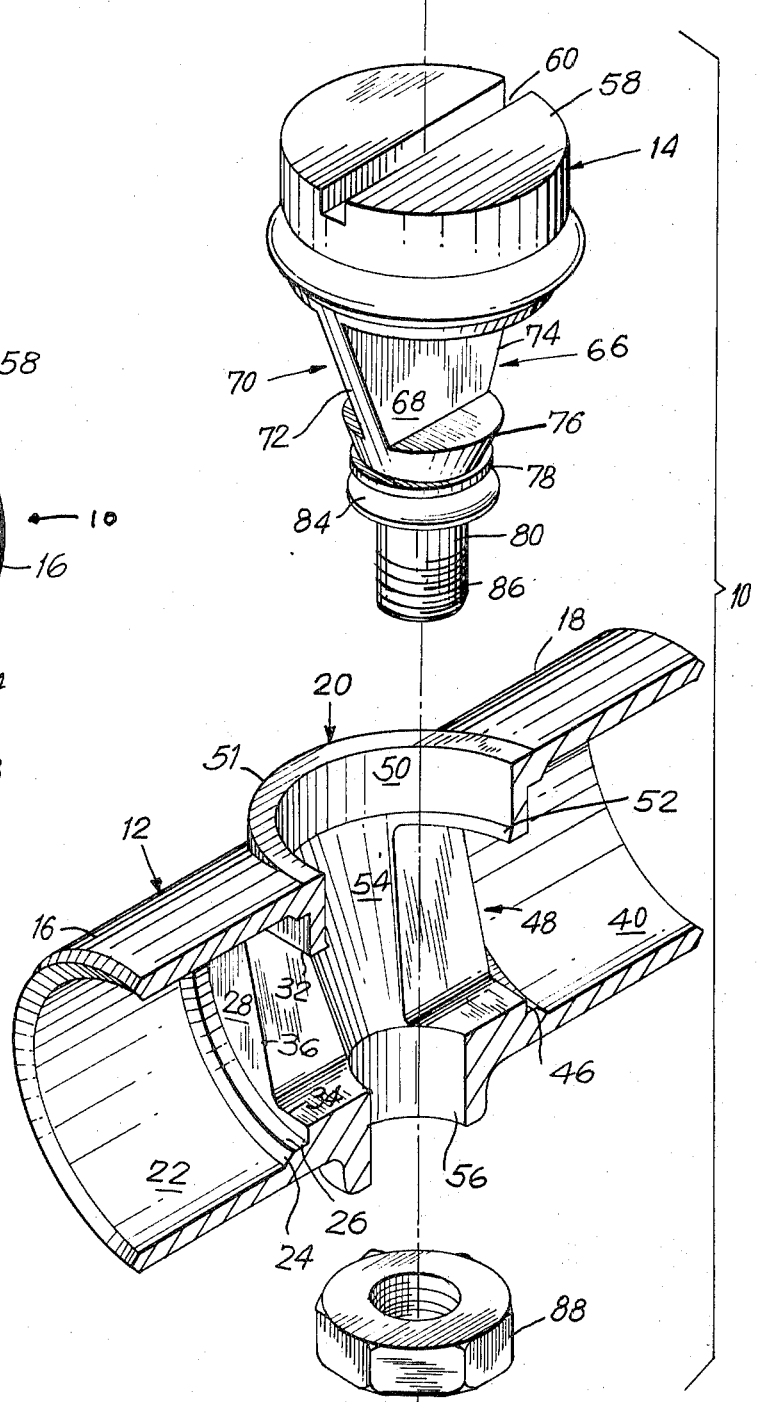
FIG. 2 is an exploded view of the valve, showing the valve body sectioned and the valve stem unbroken.
Figure 4:
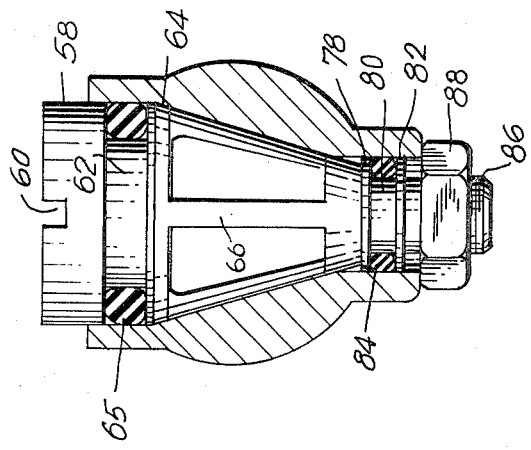
FIG. 4 is a sectional view taken substantially along the line 4—4 of FIG. 3.

In the drawings an isolation/regulating valve 10 according to the present invention is illustrated. The same includes a valve body 12 and a valve stem 14. Valve body 12 includes an inlet section 16, a discharge section 18 and a valve body section 20. While section 16 is referred to as an "inlet", this is for the ease of description and, as will be apparent to any worker having ordinary skill in the art, section 16 could be used for discharge purposes and section 18 for inlet purposes.

Inlet section 16 has at its most upstream portion a hollow cylindrical interior 22. The ingress end of inlet section 16 is adapted to be connected to a conduit or other fluid conducting means for use. Inlet section 16 is designed for connection to a conduit by a sweat joint. Any other suitable construction of inlet sections for use as a different known coupling can be alternatively employed as, for example, threads for a threaded coupling, a flange for a flanged coupling or a compression fitting for a compression coupling. The same, of course, applies to discharge section 18.

An internal shoulder 24 for limiting insertion of a conduit into the inlet section is located at the downstream end of inlet section 16 and decreases in cross-sectional area from inlet section 16 towards valve seat section 20. Downstream of internal shoulder 24 is a narrow transition zone 26 which forms the most downstream portion of inlet section 16 and approximately matches the internal diameter of a conduit inserted in the inlet section so as to minimize hydraulic pressure loss due to eddy flows. Transition zone 26 is circular in cross-section and has a slightly smaller diameter than the diameter of interior of inlet section 16.

Immediately adjacent and downstream of transition zone 26 and forming the most upstream portion of valve seat section 20 is a wall 28 which is perpendicular to the central longitudinal axis of inlet section 16. Wall 28 includes a trapezoidally-shaped opening 30. Trapezoidally-shaped opening 30 includes an upper edge 32, a lower edge 34 parallel to the upper edge and equal length side edges 36 and 38 which converge symmetrically towards each other and intersect lower edge 34 at their lowermost ends as well as with upper edge 32 at their uppermost ends. The intersection of any two of the edges which form opening 30 is filleted to a small radius. Opening 30 extends downstream through valve body section 20 as a passageway and terminates in manner that is hereinafter described.

The interior 40 of the downstream portion of discharge section 18 is cylindrical and preferably has the same diameter as interior 22 of inlet section 16. Located upstream of interior 40 in discharge section 18 is a shoulder 42 identical in configuration, but mirror-imaged, to shoulder 24. Upstream of shoulder 42 is a transition zone 44 identical to transition zone 26.

Located at the most downstream portion of valve body section 20 is a wall 46 which is parallel to wall 28 but spaced therefrom. A trapezoidal opening 48 extends through wall 46 and is identical in configuration to trapezoidal opening 30. Trapezoidal opening 48 extends upstream of wall 46 through valve body 12 as a passageway and the upstream limits of said passageway will hereinafter be described. The openings 30, 48 and their associated passageways are in registry.

Located at the center of valve body section 20 and extending through the uppermost portion thereof is an upper cylindrical opening 50. Valve body 12 includes a rim 51 at its uppermost portion which is the most elevated segment of valve body 12 and defines the upper limit of cylindrical opening 50. Cylindrical opening 50 extends into valve body 20 to a point below the uppermost portions of the inlet and discharge sections. Formed in valve body 12 beneath cylindrical opening 50 is a tapered squat unbroken circular shoulder 52, the taper being in an inward and downward direction. Located in valve body 12 and extending downwardly from tapered shoulder 52 is a frustoconical valve seat 54 which has a taper that is a continuation of the taper of shoulder 52. The passageway from trapezoidal opening 30 extends downstream to frustoconical valve seat 54. In a similar fashion, the passageway from trapezoidal opening 48 extends upstream to frustoconical valve seat 54.

Extending downwardly from frustoconical valve seat 54 is a cylindrical opening 56 which terminates at the bottom of valve body 12. The upper portion of cylindrical opening 56 is elevated slightly above the lowermost portions of inlet 16 and discharge section 18 with the uppermost portion of opening 56 at the same elevation as the lower edges of the passageways from trapezoidal openings 30 and 48. The central axis of cylindrical opening 56 is coincident with (a copolymer central axis of cylindrical opening 50 and of valve seat 54.

Valve stem 14 includes an upper valve head 58 having a diametral slot 60 extending downwardly from the upper surface thereof. As can be seen in the drawings, valve head 58 is circular in cross-section and has a slightly smaller cross-sectional area than the cross-sectional area of cylindrical opening 50. Depending downwardly from valve head 58 is a post 62 which has a substantially smaller cross-sectional area than that of valve head 58. Integral with the bottom of post 62 is a flange 64. The upper portion of flange 64 is circular in cross-section, having the same cross-section as valve head 58. The lower portion of flange 64 is tapered with its taper matching that of tapered shoulder 52.

Positioned about post 62 and captive between valve head 58 and flange 64, is an O-ring 65.

Depending downwardly from flange 64 is a thin valve blade 66 having parallel opposed trapezoidally-shaped flat surfaces 68 and 70 which are identical in configuration and in registry with each other. Valve blade 66 includes edges 72 and 74 which converge towards one another in a downward direction and are of equal length. The taper of edges 72 and 74 matches that of frustoconical seat 54. The upper and lower edges of surfaces 68 and 70 are parallel to one another. It is noted that edges 72 and 74 are sections of a frustoconical surface the curvature and taper of which match those of valve seat 54.

Depending downwardly from valve blade 66 is a frustoconical lower valve head 76 the taper and curvature of which are continuations of those of edges 72 and 74. Integral with the bottom of frustoconical valve head 76 is an O-ring plate 78 which has a slightly smaller cross-section than cylindrical opening 56 and is rotatable therein. Depending downwardly from O-ring plate 78 is a post 80 that carries a lower O-ring plate 82 identical in configuration to O-ring plate 78 but spaced therefrom. Positioned about post 80 between O-ring plates 78 and 82 is an O-ring 84. Post 80 extends past O-ring plate 82 and the lower portion thereof 86 is threaded. A nut 88 is provided for engagement with the lower portion of post 80.

Figure 6:
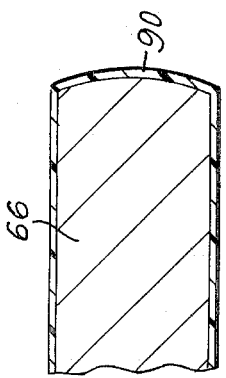
FIG. 6 is an enlarged sectional view taken substantially along the line 6—6 of FIG. 3, showing the coating in exaggerated thickness.
Figure 3:
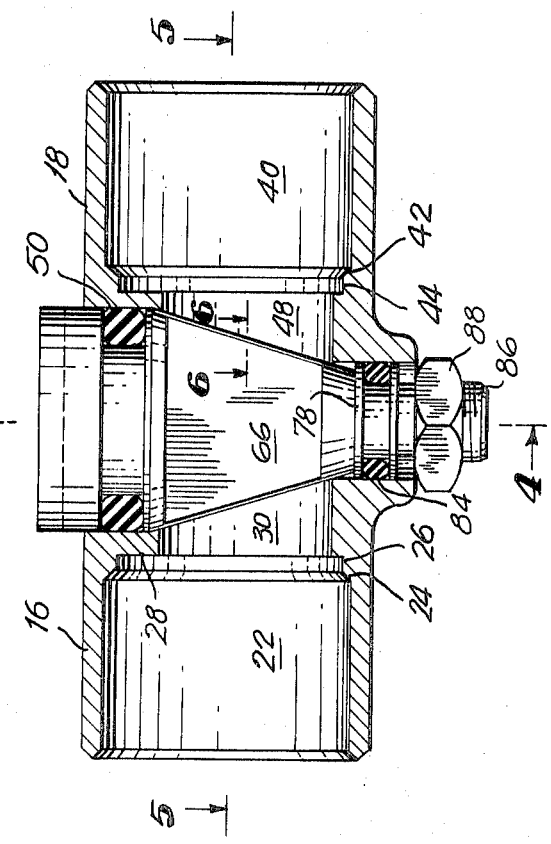
FIG. 3 is a sectional view taken substantially along the line 3—3 of FIG. 1.
Figure 5:
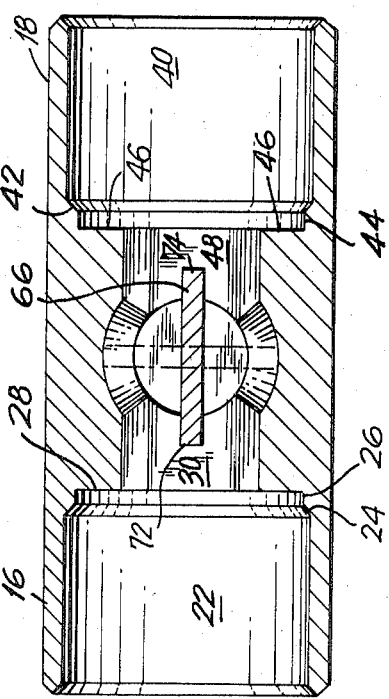
FIG. 5 is a sectional view taken substantially along the line 5—5 of FIG. 3 showing in solid lines the valve blade in the position which corresponds to maximum flow through the valve body and in dot-and-dash lines the position which prevents flow through the valve body.

A thin layer 90, e.g. 0.001 inch, of a low friction elastomeric material, preferably a synthetic plastic having a low coefficient of static and dynamic friction is coated at least on the tapered portion of flange 64, on the rounded edges of valve blade 66 and on lower valve head 76. The coating is shown in exaggerated thickness in FIG. 6. Examples of such materials are polyethylene, polyproplyene, polyhalogenated hydrocarbons such as Teflon-TFE (polytetrefluoroethylene), Teflon-FEP a copolymer of tetrafluoroethylene and hexafluoropropylyene) and Kel-F (polychlorotrifluoroethylene), and silicone resins.

To assemble the valve stem in the valve body, valve stem 14, with the nut 88 removed, is inserted through cylindrical opening 50 until the tapered portion of flange 64 seats on shoulder 52 and also on the upper portion of valve seat 54. At the same time, the edges of blade 66 engage frustoconical seat 54 unless the stem is in closed position. With valve stem 14 in its seated position lower valve head 76 is partially above cylindrical opening 56 and partially in the interior thereof with the upper portion of valve head 76 seated on a lower portion of valve seat 54. Thereafter nut 88 is threaded on post 80 to complete assembly. The O-rings provide rotatable sealing engagements with openings 50 and 56.

When it is desired to have maximum flow through valve body 12, nut 88 is loosened and valve stem 14 is rotated by placing the tip of a screwdriver in slot 60 and rotating the stem until valve blade 66 is parallel to the flow axis of the valve body. Although the use of a screwdriver has been mentioned for rotating valve stem 14 a coin can be used for this purpose.

After the valve stem has been positioned in any desired orientation nut 88 is tightened. This pulls valve stem 14 downwardly so that the tapered portion of flange 64 presses firmly against shoulder 52 and seat 54, the edges of blade 66 press against seat 54 if the valve is closed and the upper portion of frustoconical valve head 76 presses firmly against frustoconical valve seat 54. As a result, valve stem 14 is tightly locked in place and cannot rotate. In closed positions of the valve stem the coating 90, due to its resiliency, accommodates itself to any irregularity in the valve body so that there is a positive and complete shut off. The liquid which flows from inlet 16 with the valve fully open passes through trapezoidal opening 30 and its associated passageway and is split by blade 66 so that a portion of the liquid flows adjacent surface 68 and the remaining portion of the liquid flows past surface 70. The fluid then flows through the passageway associated with trapezoidal opening 48 and through the discharge section. The trapezoidal cross-sectional shape of the passageway minimizes water turbulence.

In view of the relative thinness of blade 66 and the arrangement of the trapezoidal openings and associated passageways, there is a low resistance to flow through valve body 12, uniform pressure and velocity distributions and hence the pressure drop across said valve body is minimized.

When it is desired to fully block flow through valve body 12, nut 88 is loosened and valve stem 14 is rotated so that valve blade 66 is parallel to wall 28. Nut 88 then is tightened and valve stem 14 is locked into a blocking orientation by the abutment of the different mating surfaces described above, supra.

If it is desired to have less than maximum flow through valve body 12, nut 88 is loosened and valve stem 14 rotated until a desired flow rate is obtained. Nut 88 is then tightened locking the valve stem in the required position.

Coating 90, in addition to providing an excellent seal, avoids metal-to-metal contact that characterized some prior art isolation/regulating valves. Moreover, due to the low coefficient of static and dynamic friction there is little friction between the mating portions of the valve stem and the valve body and the effort required to rotate valve stem 14 is minimal thus making operation easy and enabling accurate balance to be readily obtained. An additional advantage of utilizing coating 90 is that when the nut is loosened to change the position of valve stem 14 the coating, which is resilient, urges the valve stem slightly upwardly so that the chance of any of the mating surfaces wedging together to lock is minimized. Further, no lubricant is required with the inherent drawbacks thereof noted above.

The mating convergence angles of the valve stem and valve seat are sufficiently great so that the stem will not wedge, i.e. self-lock, itself in the seat and any tendency for this to occur is prevented by the coating 90.

It thus will be seen that there is provided a fluid flow isolation/regulating valve which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described the invention there is claimed as new and desired to be secured by Letters Patent:

1. A valve including
   A. a valve body,
   B. said valve body having
      i. a valve seat,
      ii. an inlet section and
      iii. a discharge section,
   C. said inlet section having means providing a bore terminating at a port at the valve seat,
   D. said discharge section having means providing a bore starting at a port at said valve seat,
   E. said ports being in alignment,
   F. said valve seat being of frustoconical configuration,
   G. said valve body having a first circular opening extending upwardly from and having a diameter at least equal to the larger diameter end of said valve seat, said first opening being above the tops of said bores,
   H. said valve body having a second circular opening extending downwardly from and having a diameter no larger than the smaller diameter end of said valve seat, said second opening being below the bottoms of said bores,
   I. a valve stem rotatable in said valve body for regulating the flow of liquid from the bore of said inlet section to the bore of said discharge section,
   J. said valve stem including a flow control element rotatable in said valve seat,
      i. said flow control element having opposed parallel first and second flat surfaces which are identical to and in registry with one another,
      ii. said first and second surfaces being of identical trapezoidal condiguration,
      iii. the configuration of the side edges of the flow control element matching the configuration of said valve seat,
   K. said valve stem having a tapered flange above said flow control element the configuration of which matches the configuration of the valve seat above the tops of the ports,
   L. said valve stem having a frustoconical lower head below the flow control element the configuration of which matches the configuration of the valve seat below the bottoms of the ports,
   M. said valve stem having an upper valve head extending upwardly from the tapered flange of said flow control element,
      i. the diameter of said upper valve head being smaller than that of the first circular opening,
   N. said valve stem having a circular post extending downwardly from the smaller diameter end of said lower head,
      i. the diameter of said post being smaller than that of the second circular opening,
   O. first annular groove means on said upper valve head,
   P. a first annular O-ring in said first annular groove means,
      i. said first O-ring sealingly engaging said first circular opening,
   Q. a second annular groove means on said post,
   R. a second annular O-ring in said second annular groove means,
      i. said second O-ring sealingly engaging said second circular opening,
   S. means for rotating said valve stem, and
   T. means for pulling said valve stem downwardly into said valve seat so that said tapered flange and frustoconical lower head engage said valve seat above the tops of said posts and below the bottoms of said posts.

2. A valve according to claim 1 wherein the ports are of identical trapezoidal configuration with the wider ends of the ports uppermost.

3. A valve according to claim 1 wherein the side edges of the flow control element are coated with a resilient low friction material.

4. A valve according to claim 13 wherein the resilient low friction material is a synthetic plastic having a low coefficient of static and dynamic friction.

5. A valve according to claim 4 wherein the coating of resilient low friction material is in the order of 0.001 inch.

6. A valve according to claim 4 wherein the synthetic plastic is selected from the class consisting of polyethylene, polypropylene, polyhalogenated hydrocarbons, a coplymer of tetrafluoroethylene and hexafluoropropylene and polychloro-trifluoroethylene.

7. A valve according to claim 1 wherein the means for pulling the valve stem downwardly into the valve seat includes male and female interengaging threaded members one of which bears against the bottom of the valve body.

8. A valve according to claim 7 in which the male member is formed on the post and the female member is a nut.

* * * * *